(12) United States Patent
Melanson et al.

(10) Patent No.: US 8,749,173 B1
(45) Date of Patent: Jun. 10, 2014

(54) DIMMER COMPATIBILITY WITH REACTIVE LOADS

(75) Inventors: John L. Melanson, Austin, TX (US); Eric J. King, Dripping Springs, TX (US); Robert T. Grisamore, Austin, TX (US); Firas S. Azrai, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 489 days.

(21) Appl. No.: 13/194,699

(22) Filed: Jul. 29, 2011

Related U.S. Application Data (60) Provisional application No. 61/369,202, filed on Jul. 30, 2010.

(51) Int. Cl.
*H05B 41/36* (2006.01)
*G05F 1/00* (2006.01)

(52) U.S. Cl.
USPC .......................................... 315/307; 315/291

(58) Field of Classification Search
USPC ............................. 315/291, 307, 224, 209 R
See application file for complete search history.

(56) References Cited

U.S. PATENT DOCUMENTS

| | | | |
|---|---|---|---|
| 5,319,301 A | 6/1994 | Callahan et al. |
| 5,430,635 A | 7/1995 | Liu |
| 6,713,974 B2 | 3/2004 | Patchornik et al. |
| 6,858,995 B2 | 2/2005 | Lee et al. |
| 6,900,599 B2 | 5/2005 | Ribarich |
| 7,102,902 B1 | 9/2006 | Brown et al. |
| 7,180,250 B1 | 2/2007 | Gannon |
| 7,656,103 B2 | 2/2010 | Shteynberg et al. |
| 7,719,246 B2 | 5/2010 | Melanson |
| 7,733,678 B1 | 6/2010 | Notohamiprodjo et al. |
| 7,759,881 B1 | 7/2010 | Melanson |
| 7,872,427 B2 | 1/2011 | Scianna |
| 8,102,167 B2 | 1/2012 | Irissou et al. |

(Continued)

FOREIGN PATENT DOCUMENTS

| | | |
|---|---|---|
| EP | 1164819 | 12/2001 |
| EP | 2257124 A1 | 1/2010 |

(Continued)

OTHER PUBLICATIONS

Azoteq, IQS17 Family, IQ Switch-ProxSense Series, Touch Sensor, Load Control and User Interface, IQS17 Datasheet V2.00.doc, Jan. 2007, pp. 1-51, Azoteq (Pty) Ltd., Paarl, Western Cape, Republic of South Africa.

(Continued)

*Primary Examiner* — Minh D A
(74) *Attorney, Agent, or Firm* — Terrile, Cannatti, Chambers & Holland, LLP; Kent B. Chambers (57) ABSTRACT

A system and method includes a controller that alternately enables at least two different current paths for a current flowing through a dimmer when the dimmer is in an OFF mode. In at least one embodiment, enabling and disabling the current paths allows a power supply of the dimmer to continue functioning and provides the controller sufficient voltage to continue functioning. One of the current paths is a low impedance path and another current path is a path to a voltage supply node of a switching power converter controller. In at least one embodiment, the controller generates an impedance control signal to enable a low impedance current path for a current in the dimmer and alternately provide a current path to the voltage supply node for the controller.

27 Claims, 11 Drawing Sheets

(56) References Cited

U.S. PATENT DOCUMENTS

| | | | |
|---|---|---|---|
| 8,115,419 | B2 | 2/2012 | Given et al. |
| 8,169,154 | B2 | 5/2012 | Thompson et al. |
| 8,212,491 | B2 | 7/2012 | Kost |
| 8,212,492 | B2 | 7/2012 | Lam et al. |
| 8,222,832 | B2 | 7/2012 | Zheng et al. |
| 2004/0105283 | A1 | 6/2004 | Schie et al. |
| 2004/0212321 | A1 | 10/2004 | Lys et al. |
| 2006/0022648 | A1 | 2/2006 | Ben-Yaakov et al. |
| 2007/0182338 | A1 | 8/2007 | Shteynberg |
| 2007/0182347 | A1* | 8/2007 | Shteynberg et al. .......... 315/312 |
| 2008/0205103 | A1 | 8/2008 | Sutardja et al. |
| 2008/0224629 | A1 | 9/2008 | Melanson |
| 2008/0224633 | A1 | 9/2008 | Melanson |
| 2008/0224636 | A1 | 9/2008 | Melanson |
| 2009/0195186 | A1 | 8/2009 | Guest et al. |
| 2009/0284182 | A1 | 11/2009 | Cencur |
| 2010/0002480 | A1 | 1/2010 | Huynh et al. |
| 2010/0013405 | A1 | 1/2010 | Thompson |
| 2010/0013409 | A1 | 1/2010 | Quek et al. |
| 2010/0164406 | A1* | 7/2010 | Kost et al. ................. 315/307 |
| 2010/0213859 | A1 | 8/2010 | Shteynberg |
| 2010/0244726 | A1 | 9/2010 | Melanson |
| 2011/0043133 | A1 | 2/2011 | Van Laanen et al. |
| 2011/0121754 | A1 | 5/2011 | Shteynberg |
| 2011/0266968 | A1 | 11/2011 | Bordin et al. |

FOREIGN PATENT DOCUMENTS

| | | |
|---|---|---|
| EP | 2232949 | 9/2010 |
| EP | 2257124 | 12/2010 |
| JP | 2008053181 A | 3/2008 |
| WO | 02096162 A1 | 11/2002 |
| WO | 2006079937 | 8/2006 |
| WO | 2008029108 | 3/2008 |
| WO | 2010011971 A1 | 1/2010 |
| WO | 2010035155 A2 | 4/2010 |
| WO | 2011008635 A1 | 1/2011 |

OTHER PUBLICATIONS

Chan, Samuel, et al, Design and Implementation of Dimmable Electronic Ballast Based on Integrated Inductor, IEEE Transactions on Power Electronics, vol. 22, No. 1, Jan. 2007, pp. 291-300, Dept. of Electron. Eng., City Univ. of Hong Kong.

Rand, Dustin, et al, Issues, Models and Solutions for Triac Modulated Phase Dimming of LED Lamps, Power Electronics Specialists Conference, 2007. PESC 2007. IEEE, Jun. 17-21, 2007, pp. 1398-1404, Boston, MA, USA.

Gonthier, Laurent, et al, EN55015 Compliant 500W Dimmer with Low-Losses Symmetrical Switches, ST Microelectronics, Power Electronics and Applications, 2005 European Conference, pp. 1-9, Aug. 7, 2006, Dresden.

Green, Peter, A Ballast That Can Be Dimmed from a Domestic (Phase Cut) Dimmer, International Rectifier, IRPLCFL3 rev.b, pp. 1-12, Aug. 15, 2003, El Segundo, California, USA.

Hausman, Don, Real-Time Illumination Stability Systems for Trailing-Edge (Reverse Phase Control) Dimmers, Lutron RTISS, Lutron Electronics Co, Dec. 2004, pp. 1-4, Coopersburg, PA, USA.

Lee, Stephen, et al, A Novel Electrode Power Profiler for Dimmable Ballasts Using DC Link Voltage and Switching Frequency Controls, IEEE Transactions on Power Electronics, vol. 19, No. 3, May 2004, pp. 847-833, City University of Hong Kong.

Engdahl, Tomi, Light Dimmer Circuits, 1997-2000, www.epanorama.net.

O'Rourke, Conan, et al, Dimming Electronic Ballasts, National Lighting Product Information Program, Specifier Reports, vol. 7, No. 3, Oct. 1999, pp. 1-24, Troy, NY, USA.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

Why Different Dimming Ranges, http://www.lutron.com/TechnicalDocumentLibrary/LutronBallastpg3.pdf.

Wu, Tsai-Fu, et al, Single-Stage Electronic Ballast with Dimming Feature and Unity Power Factor, IEEE Transactions on Power Electronics, vol. 13, No. 3, May 1998, pp. 586-597.

* cited by examiner

```
If the dimmer 404 is in a OFF mode:

then:

(A) If voltage V_DD is less than the low threshold value UVLO_LOW and a timer
        time value t is greater than a minimum value, such as 0, then:

disable the low impedance current path 503, enable the current path 505 to charge the voltage supply node 412
                until the value of the voltage V_DD, and reset the timer time value t to the minimum value;

else:

increment the timer time value t;

enable the low impedance path 503 for the dimmer current i_DIM for a
time            equal to the minimum value of t; and return to (A)

else:

begin normal operation of the controller 402 because the dimmer 104 is in a
    dimming mode.
```

$C_{IMPED} = [B_0, B_1, ..., B_N]$

DIMMER COMPATIBILITY WITH REACTIVE LOADS

CROSS-REFERENCE TO RELATED APPLICATION

This application claims the benefit under 35 U.S.C. §119 (e) and 37 C.F.R. §1.78 of U.S. Provisional Application No. 61/369,202, filed Jul. 30, 2010, and entitled "LED Lighting Methods and Apparatuses" and is incorporated by reference in its entirety.

BACKGROUND OF THE INVENTION

1. Field of the Invention

The present invention relates in general to the field of electronics, and more specifically to a method and system for dimmer compatibility with loads that include a reactive impedance.

2. Description of the Related Art

The power control systems often utilize dimmers to establish an amount of power to be delivered to a load such as one or more light emitting diodes or other electronic devices. A typical dimmer is inserted in a circuit in series with a supply voltage source and a load. The dimmer phase cuts the supply voltage, which reduces the average power delivered to the load. The degree of the phase cut can be changed, such as with a user input, which, thus, allows the dimmer to modulate power delivered to the load. Modulating the power delivered to the load facilitates a number of common functions, such as dimming a lamp to reduce the brightness of the lamp.

Figure 1:
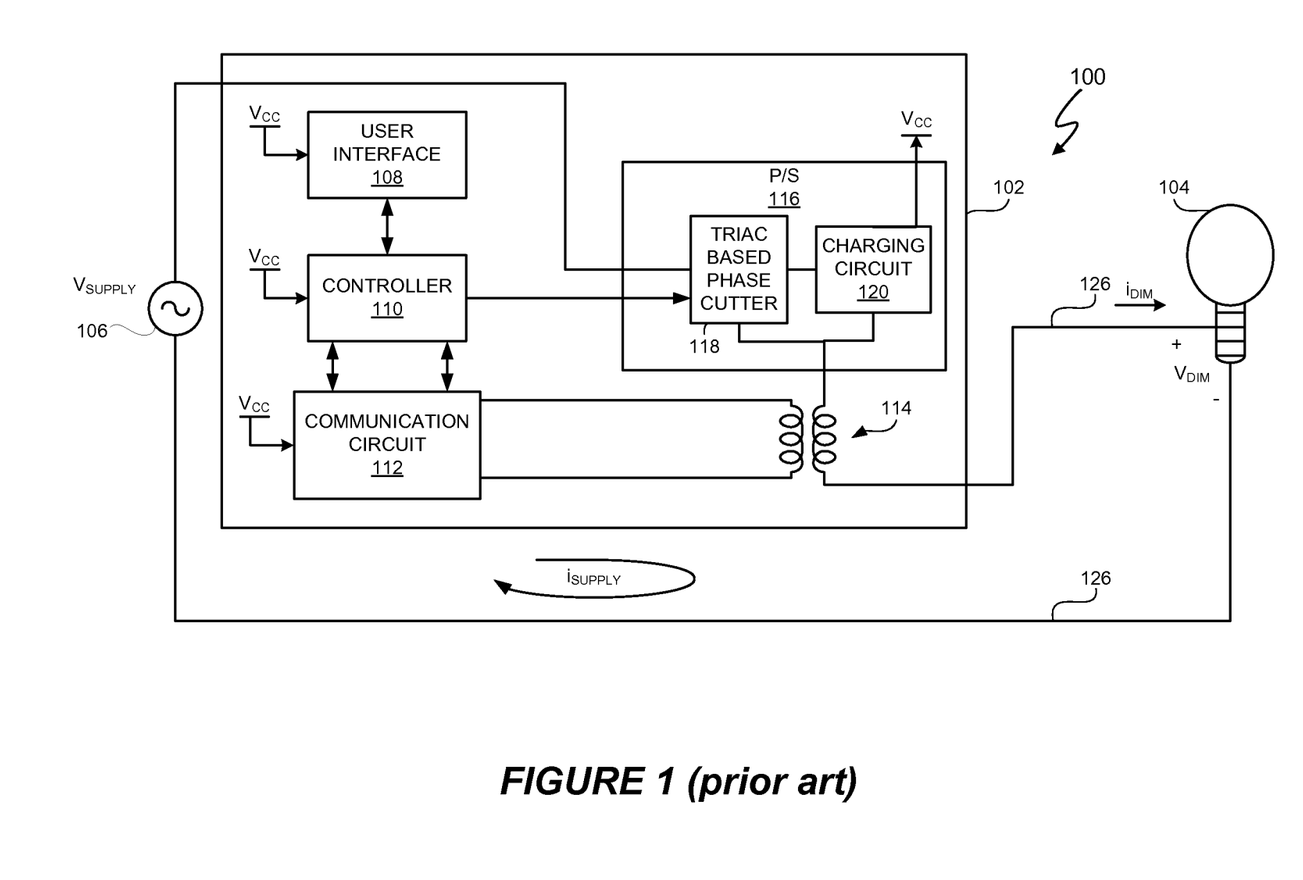
FIG. 1 (labeled prior art) depicts a lighting system that includes a dimmer that modulates power delivered to an incandescent lamp.
Figure 1A:
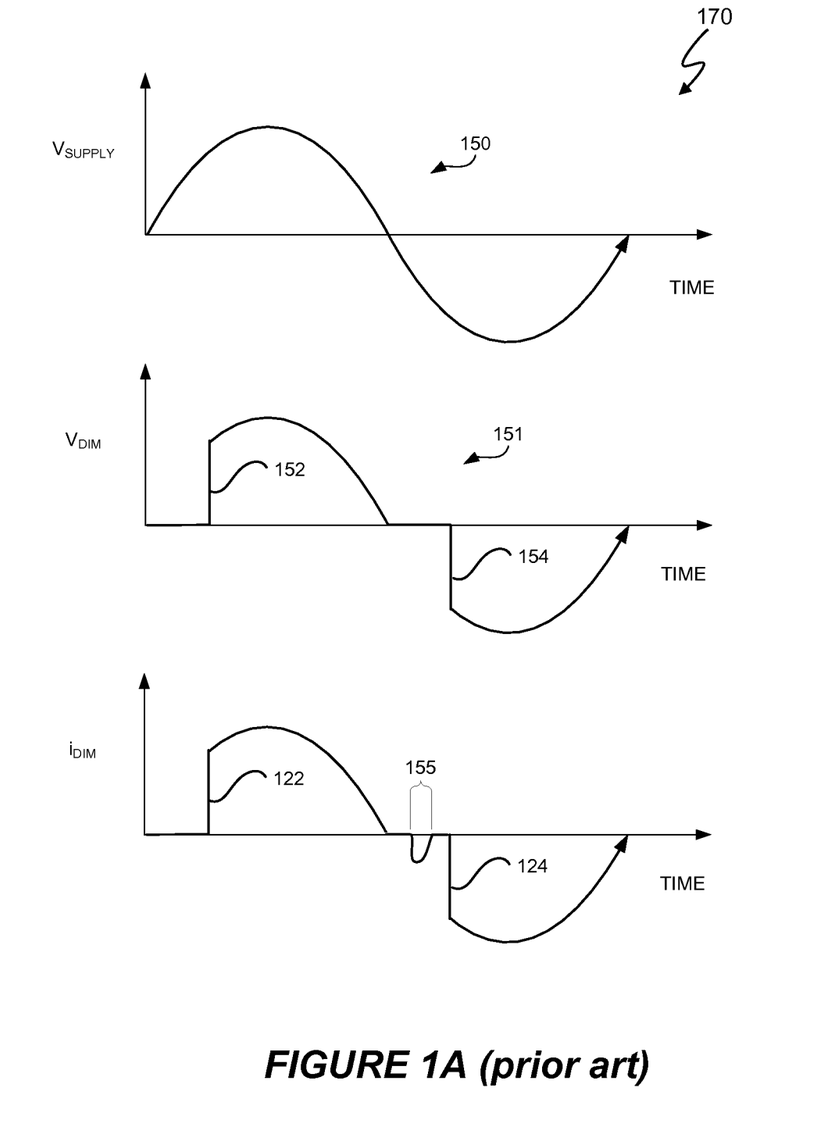
FIG. 1A (labeled prior art) depicts exemplary signals for the lighting system of FIG. 1 when the dimmer is in a dimming mode.

FIG. 1 depicts a lighting system 100 that includes a dimmer 102 that modulates power delivered to an incandescent lamp 104. FIG. 1A depicts exemplary signals for the lighting system 100 when the dimmer 102 is in a dimming mode. Referring to FIGS. 1 and 1A, voltage source 106 supplies an alternating current (AC) input voltage $V_{SUPPLY}$ for the lighting system 100. Voltage waveform 150 represents one embodiment of the supply voltage $V_{SUPPLY}$. The voltage source 106 is, for example, a public utility, and the AC voltage $V_{SUPPLY}$ is, for example, a 60 Hz/110 V line voltage in the United States of America or a 50 Hz/220 V line voltage in Europe. The dimmer 102 is connected in series with the lamp 104, and the voltage source 106 so that a supply current $i_{SUPPLY}$ flows from the voltage source 106, the dimmer 102, and the lamp 104.

Dimmer 102 is commonly referred to as a "smart dimmer". Smart dimmers are generally referred to as a class of dimmers that include a controller, such as controller 110. The dimmer 102 includes a user interface 108 that, for example, receives dimming level inputs from a user. A controller 110 is connected to a communication circuit 112 to, for example, transmit and receive control information via the transformer 114 to and from other dimmers (not shown) that may also be connected to the voltage source 106. The dimmer 102 also includes a power supply 116 that includes a triac-based phase cutter 118 and a charging circuit 120. The controller 110 controls the phase cut angle of the supply voltage $V_{SUPPLY}$, and the phase cut supply voltage is supplied as a dimmer voltage $V_{DIM}$. Voltage waveform 151 depicts an exemplary cycle of dimmer voltage $V_{DIM}$ with phase cuts 152 and 154. During the period 155, which occurs once per cycle of the supply voltage $V_{SUPPLY}$ during the phase cut portion of the dimmer voltage $V_{DIM}$, the dimmer 102 essentially functions as a current source to supply a dimmer current $i_{DIM}$ during period 155 to the charging circuit 120. The charging circuit 120 utilizes the current $i_{DIM}$ during the period 155 to generate direct current (DC) voltage $V_{CC}$. Voltage $V_{CC}$ provides an operational supply voltage to the user interface 108, controller 110, and communication circuit 112. U.S. Pat. No. 7,423,413 contains a more detailed, exemplary description of lighting system 100.

Figure 2:
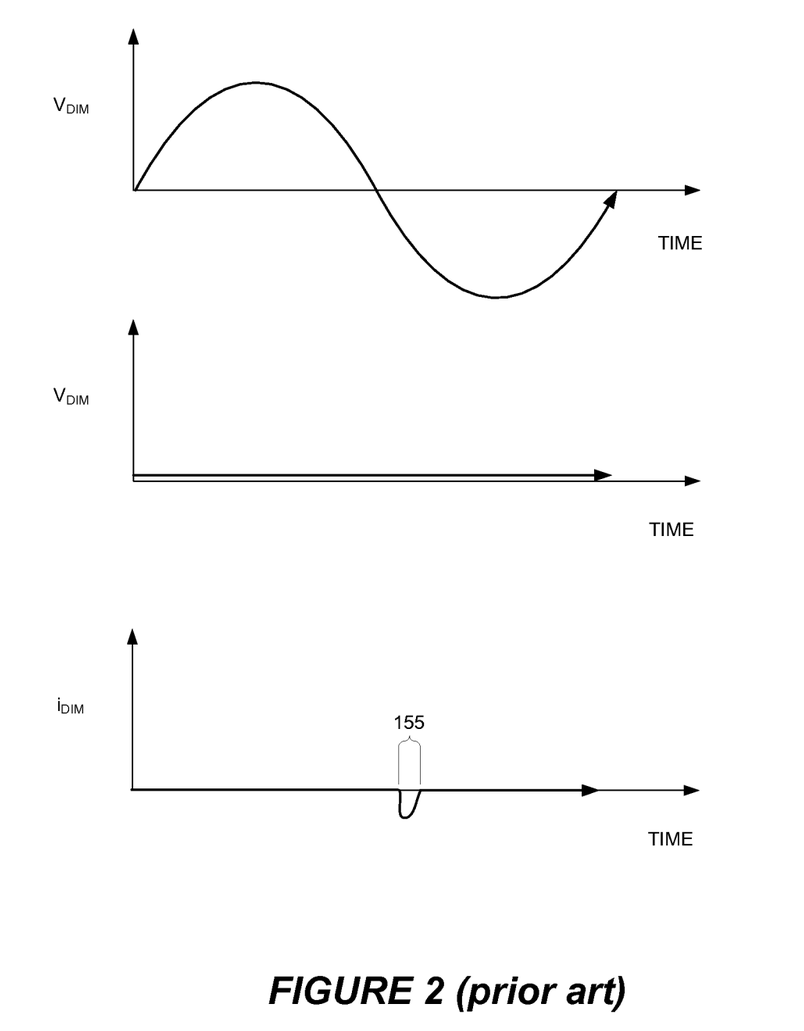
FIG. 2 (labeled prior art) depicts exemplary signals for the lighting system of FIG. 1 when the dimmer is in an OFF mode.

FIG. 2 depicts exemplary signals 170 when dimmer 102 is in an OFF mode. Referring to FIGS. 1 and 2, when the dimmer 102 is in an OFF mode, the dimmer voltage $V_{DIM}$ is approximately 0V, and the lamp 104 is not drawing any power. However, the charging circuit 120 continues to draw current during the portion 155 of each cycle of the supply voltage $V_{SUPPLY}$. Since the lamp 104 has a resistive impedance, the current $i_{DIM}$ continues to flow during the OFF mode. The charging circuit 120 utilizes the reduced supply current $i_{SUPPLY}$ to maintain voltage $V_{CC}$ during the OFF mode so that the dimmer 102 can continue to operate and respond to user commands via the user interface 108. The lighting system 100 is a 2-wire system that has a "hot" wire 126 and a ground wire 126. Governmental regulations often prevent current return directly from the dimmer 102 to earth ground. However, the lamp 104 provides a low resistance current return path for the supply current $i_{SUPPLY}$ even during the OFF mode.

Figure 3:
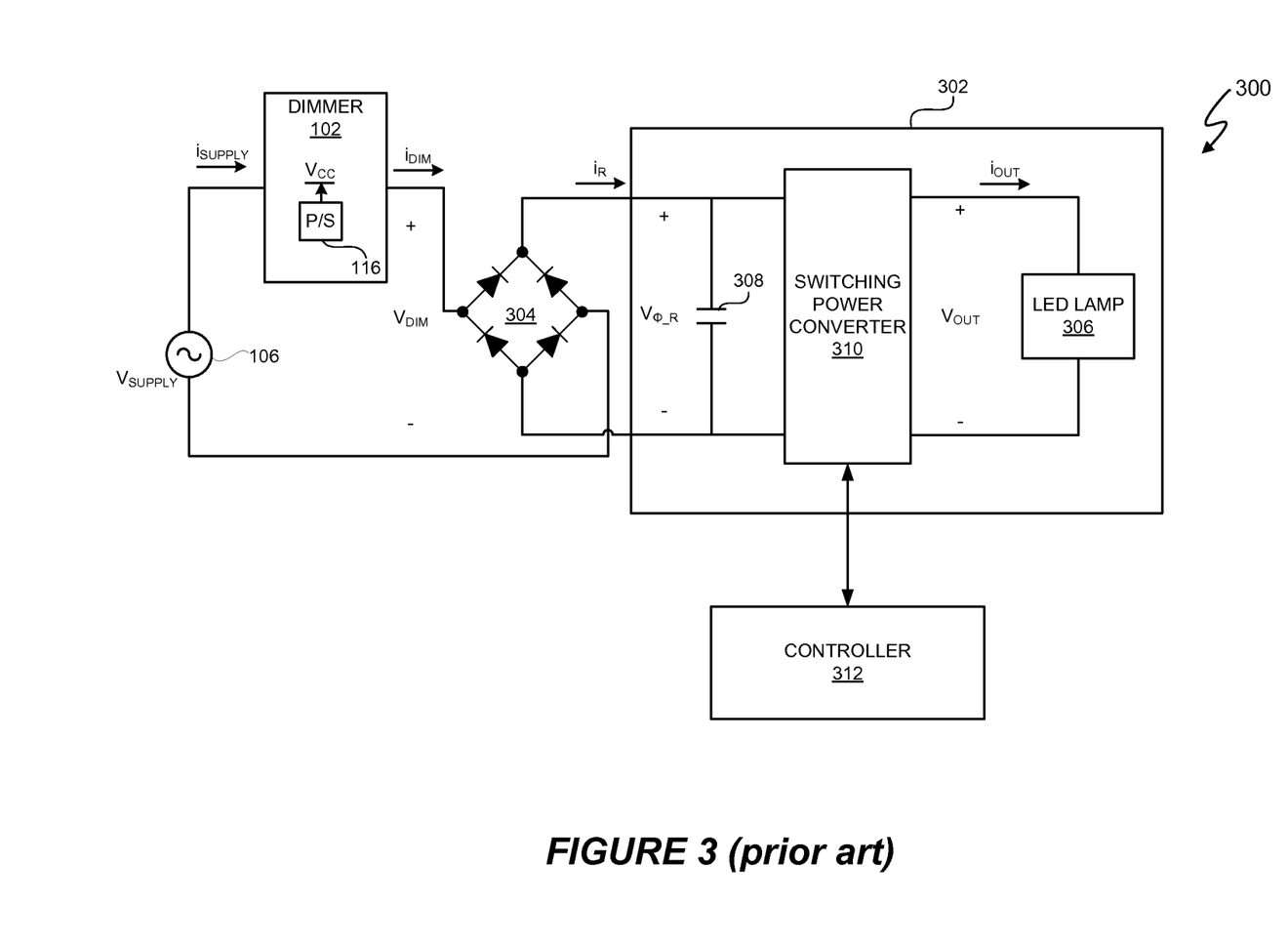
FIG. 3 (labeled prior art) depicts a lighting system that includes a dimmer that modulates power delivered to a reactive load.

FIG. 3 depicts a lighting system 300 that includes the dimmer 102 coupled to a reactive load 302 via full-bridge diode rectifier 304. A "reactive" load is a load that includes capacitive and/or inductive impedances. The load 302 in lighting system 300 includes a capacitor 308, which has a reactive impedance, and includes an LED lamp 306. LED lamp 306 operates with a DC output voltage $V_{OUT}$ and is dimmed by changing the DC level of the output current $i_{OUT}$. To provide the DC output voltage $V_{OUT}$, the rectifier 304 rectifies the dimmer voltage $V_{DIM}$ to generate the rectified dimmer voltage $V_{\phi\_R}$. Capacitor 308 filters any high frequency signals from the rectified dimmer voltage $V_{\phi\_R}$. The capacitance value of capacitor 308 is a matter of design choice. In at least one embodiment, the capacitance value is sufficient to reduce electromagnetic interference to acceptable levels and is, for example, 22 nF. The switching power converter 310 converts the rectified dimmer voltage $V_{\phi\_R}$ into the DC output voltage. Controller 312 controls the switching power converter 310 to generate a desired level of the DC output voltage and output current $i_{OUT}$ and provide power factor correction. The switching power converter 310 can be any type of switching power converter such as a boost, buck, boost-buck, or Ćuk switching power converter. Prodić, *Compensator Design and Stability Assessment for Fast Voltage Loops of Power Factor Correction Rectifiers*, IEEE Transactions on Power Electronics, Vol. 22, No. 5, September 3007, pp. 1719-1729, describes an example of controller 312.

Referring to FIGS. 2 and 3, when the dimmer 102 is in the OFF mode, the capacitor 308 will eventually discharge, and the dimmer 102 will no longer have a source of charge for the power supply 116 to maintain the voltage $V_{CC}$. The charging circuit 120 (FIG. 1) of dimmer 102 still needs a supply current $i_{SUPPLY}$ to generate the voltage $V_{CC}$ so that dimmer 102 does not lose internal power. However, the level of the dimmer voltage $V_{\phi\_R}$ across capacitor 308 during the OFF mode will be greater than or equal to the dimmer voltage $V_{DIM}$. Thus, the rectified dimmer voltage $V_{\phi\_R}$ across capacitor 308 prevents the dimmer current $i_{DIM}$ from flowing through the power supply 116. Accordingly, without the dimmer current $i_{DIM}$, the dimmer 102 will lose internal functionality during at least the OFF mode.

SUMMARY OF THE INVENTION

In one embodiment of the present invention, a method includes, during an OFF mode of a dimmer, alternately enabling at least two different current paths for a current flowing through the dimmer Two of the current paths include a low impedance path to a reference node and a path to a voltage supply node of a switching power converter controller. The method also includes, during a dimming mode of the dimmer, controlling power conversion by a power converter.

In another embodiment of the present invention, an apparatus includes a controller. During an OFF mode of a dimmer, the controller is configured to alternately enable at least two different current paths for a current flowing through the dimmer. Two of the current paths comprise a low impedance path to a reference node and a path to a voltage supply node of a switching power converter controller. During a dimming mode of the dimmer, the controller is configured to control power conversion by a power converter.

In a further embodiment of the present invention, an apparatus includes means for alternately enabling at least two different current paths for a current flowing through the dimmer Two of the current paths comprise a low impedance path to a reference node and a path to a voltage supply node of a switching power converter controller during an OFF mode of a dimmer. The apparatus further includes means for controlling power conversion by a power converter during a dimming mode of the dimmer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In at least one embodiment, a system and method includes a controller that alternately enables at least two different current paths for a current flowing through a dimmer when the dimmer is in an OFF mode. In at least one embodiment, alternately enabling the current paths allows a power supply of the dimmer to continue functioning and provides the controller sufficient voltage to continue functioning. One of the current paths is a low impedance path and another current path is a path to a voltage supply node of a switching power converter controller. In at least one embodiment, the controller generates an impedance control signal to provide a low impedance current path for a current in the dimmer. The low impedance path allows a power supply of the dimmer to continue providing an internal voltage supply for the dimmer.

When the controller supply voltage decreases below a threshold value, the controller causes the low impedance path to change to a high impedance path. In at least one embodiment, the controller senses a controller supply voltage on a voltage supply node of the controller to determine when to enable each current path. In at least one embodiment, changing the low impedance path to a high impedance path enables the current path to the voltage supply node. When the controller enables the current path to the voltage supply node, the current flowing through the dimmer then charges the voltage supply node to maintain a sufficient controller supply voltage. With a sufficient supply voltage, the controller continues functioning while the dimmer is in the OFF mode. In at least one embodiment, the OFF mode is a mode when the dimmer stops phase cutting a supply voltage and approximately no power is delivered to a load. The load can be any type of load. For example, in at least one embodiment, the load is a lamp having one or more light emitting diodes.

Figure 4:
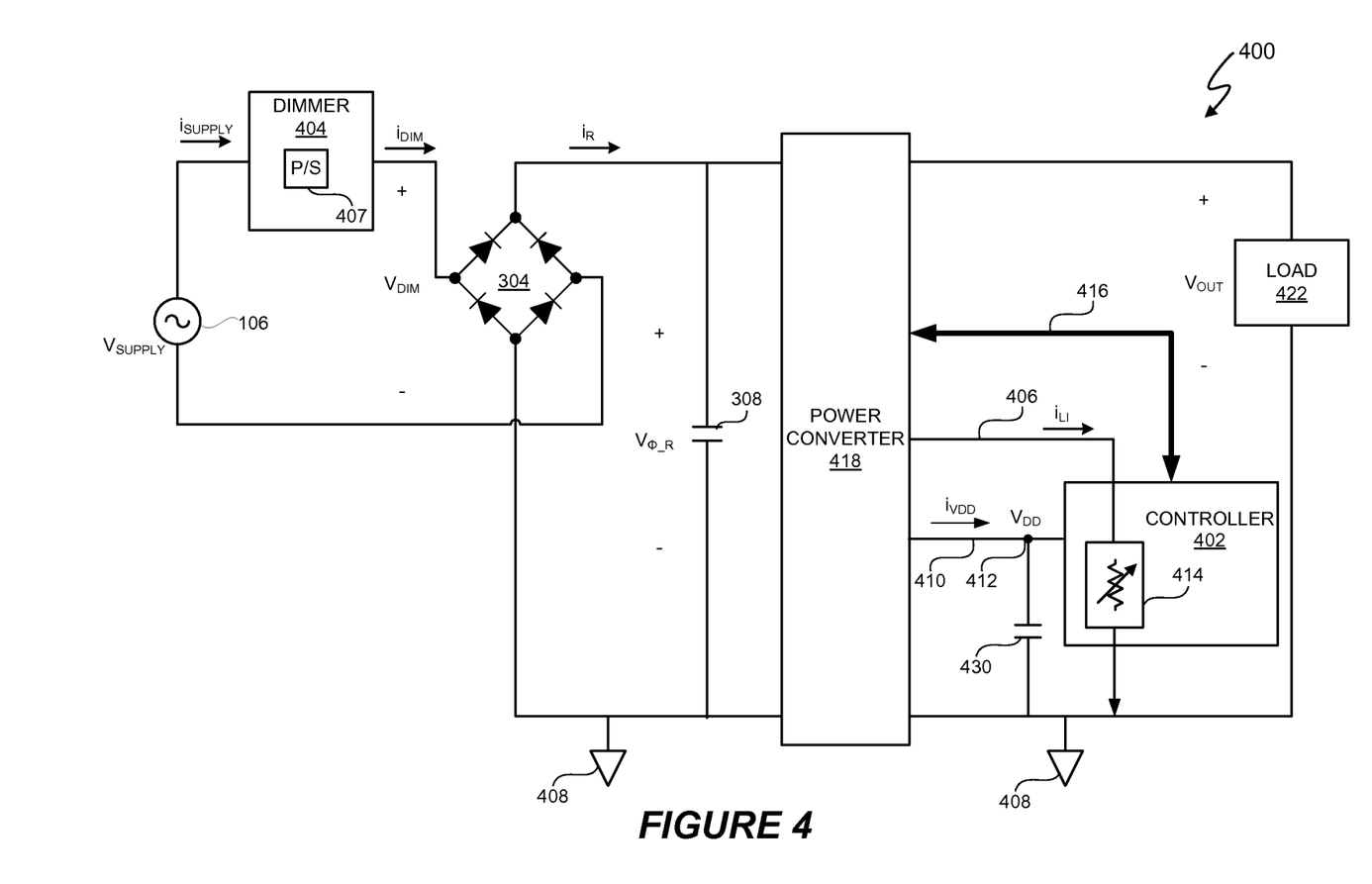
FIG. 4 depicts an electronic system that includes a controller that, during an OFF mode of a dimmer, alternately enables a low impedance current path to a reference node and a current path to a voltage supply node.

FIG. 4 depicts an electronic system 400 that includes a controller 402 that, during an OFF mode of dimmer 404, alternately enables a low impedance current path 406 to a reference node 408 and a current path 410 to a voltage supply node 412. The term "alternately enable" means that when current path 406 is enabled, current path 410 is disabled, and when current path 410 is enabled, current path 406 is disabled. In at least one embodiment, dimmer 404 is any type of dimmer having an internal power supply 407 to generate an internal voltage to supply power to internal components of the dimmer 404. In at least one embodiment, dimmer 404 is identical to dimmer 102 (FIG. 1).

Controller 402 controls an impedance value of variable impedance 414. When the dimmer 404 is in the OFF mode, the controller 402 enters a dimmer-power supply support mode. In the dimmer-power supply support mode, the controller 402 causes the variable impedance 414 to have a low impedance value. The low impedance value of variable impedance 414 provides a discharge path for the capacitor 308, which, thus, lowers the voltage $V_{\phi\_R}$ sufficiently to allow the supply current $i_{SUPPLY}$ to flow through the rectifier 304. For example, in at least one embodiment, the dimmer 404 sources a dimmer current $i_{DIM}$ (such as the dimmer current $i_{DIM}$ in period 155 of FIG. 1A) of every other cycle of the rectified input voltage $V_{\phi\_R}$ which allows the supply current $i_{SUPPLY}$ to continue flowing. The rectified current $i_R$, which is a rectified version of the dimmer current $i_{DIM}$ flowing in dimmer 404, then flows into the power converter 418 and is converted into current $i_{LI}$. Thus, a positive supply current $i_{SUPPLY}$ remains available so that power supply 407 can continue internally generating a power supply voltage for dimmer 102.

In at least one embodiment, the particular low impedance value of variable impedance 414 is a matter of design choice. In at least one embodiment, the low impedance value is set so that the voltage $V_{\phi\_R}$ across capacitor 308 is sufficiently discharged at a rate that allows the supply current $i_{SUPPLY}$ to continuously flow uninterrupted through dimmer 404.

In at least one embodiment, the value of current $i_{VDD}$ is 0 A when variable impedance 414 has a low impedance value. Voltage $V_{DD}$ across capacitor 430 provides a supply voltage to controller 402 at least while the controller 402 operates in the dimmer-power supply mode. However, when the current $i_{VDD}$ is 0 A, capacitor 420 discharges. As capacitor 420 discharges, the voltage $V_{DD}$ decreases. If the voltage $V_{DD}$ decreases too much, the value of voltage $V_{DD}$ will be insufficient to allow controller 402 to continue to operate.

To maintain voltage $V_{DD}$ at a sufficient level, such as 7.5V, for the operation of controller 402, in at least one embodiment, controller 402 senses the voltage $V_{DD}$ at the voltage supply node 412. In at least one embodiment, controller 402 determines if the voltage $V_{DD}$ is below a threshold voltage value, $UVLO_{LOW}$. If voltage $V_{DD}$ is less than the threshold voltage value $UVLO_{LOW}$, then controller 402 modulates the impedance value of variable impedance 414 to a high impedance value. The high impedance value of variable impedance 414 causes current $i_{LI}$ to stop, and the rectified current $i_R$ flows through into the voltage supply node 412. Current $i_{VDD}$, thus, increases the voltage $V_{DD}$ to allow controller 402 to continue to operate. Once the voltage $V_{DD}$ is at a sufficient level to allow controller 402 to continue to operate, controller 402 sets the impedance value of variable impedance 414 to the low impedance value, and the rectified current $i_R$ again flows through current path 406 as current $i_{LI}$. The process of alternating between current flowing through the low impedance path 406 and the path 410 to the voltage supply node 412 continues while the dimmer 404 operates in the OFF mode.

The controller 402 continues to monitor the rectified supply voltage $V_{\phi\_R}$ to determine when the dimmer 404 exits the OFF mode and begins phase cutting the supply voltage $V_{SUPPLY}$ or provides full dimming, i.e. allows the complete supply voltage $V_{SUPPLY}$ waveform through dimmer 404 without phase cutting. When the dimmer 404 exits the OFF mode, controller 402 switches from the dimmer-power supply support mode to a normal mode of operation. During normal operation, the controller 402, for example, controls power converter 418 to provide power factor correction and regulate the output voltage $V_{OUT}$ across load 422. Load 422 can be any load, and, in at least one embodiment, is a lamp that includes one or more light emitting diodes.

The particular implementation of controller 402 is a matter of design choice. Controller 402 can be implemented as an integrated circuit and/or a combination of digital and/or analog components. In at least one embodiment, power converter 418 includes a switching power converter, which can be any type of switching power converter such as a boost, buck, boost-buck, or Cúk type switching power converter. During normal operation, signal paths 416 allow controller 402 to, for example, sense the value of the rectified input voltage $V_{\phi\_R}$, the output voltage $V_{OUT}$, and provide a control signal to a power converter 418 to control power converter 418. In at least one embodiment, during normal operation, controller 402 provides power factor correction and regulation of output voltage $V_{OUT}$ as, for example, described in U.S. patent application Ser. No. 12/496,457, filed on Jun. 30, 2009, entitled *Cascode Configured Switching Using At Least One Low Breakdown Voltage Internal, Integrated Circuit Switch To Control At Least One High Breakdown Voltage External Switch*, inventor John L. Melanson, and assignee Cirrus Logic, Inc. and in U.S. patent application Ser. No. 12/496, 457, referred to herein as Melanson I, and U.S. patent application Ser. No. 13/077,421, filed on Mar. 31, 2011, entitled "*Multiple Power Sources for a Switching Power Converter Controller*", inventors John L. Melanson and Eric J. King, assignee Cirrus Logic, Inc. (referred to herein as "Melanson II"). Melanson I and Melanson II are hereby incorporated by reference in their entireties.

Variable impedance 414 can be any type of variable impedance circuit, such as, for example, a subsequently described field effect transistor (FET) or a subsequently described controllable current source. The particular relative configuration of the controller 402 and the variable impedance 414 are matters of design choice. The variable impedance 414 is depicted as being internal to the controller 402. In at least one embodiment, the variable impedance 414 is located external to the controller 402. Additionally, electronic system 400 depicts two current paths 406 and 410 for the current flowing through the dimmer 404 during the OFF mode. In at least one embodiment, the electronic system 400 includes other current paths for the current flowing through the dimmer 404 during the OFF mode.

Figure 5:
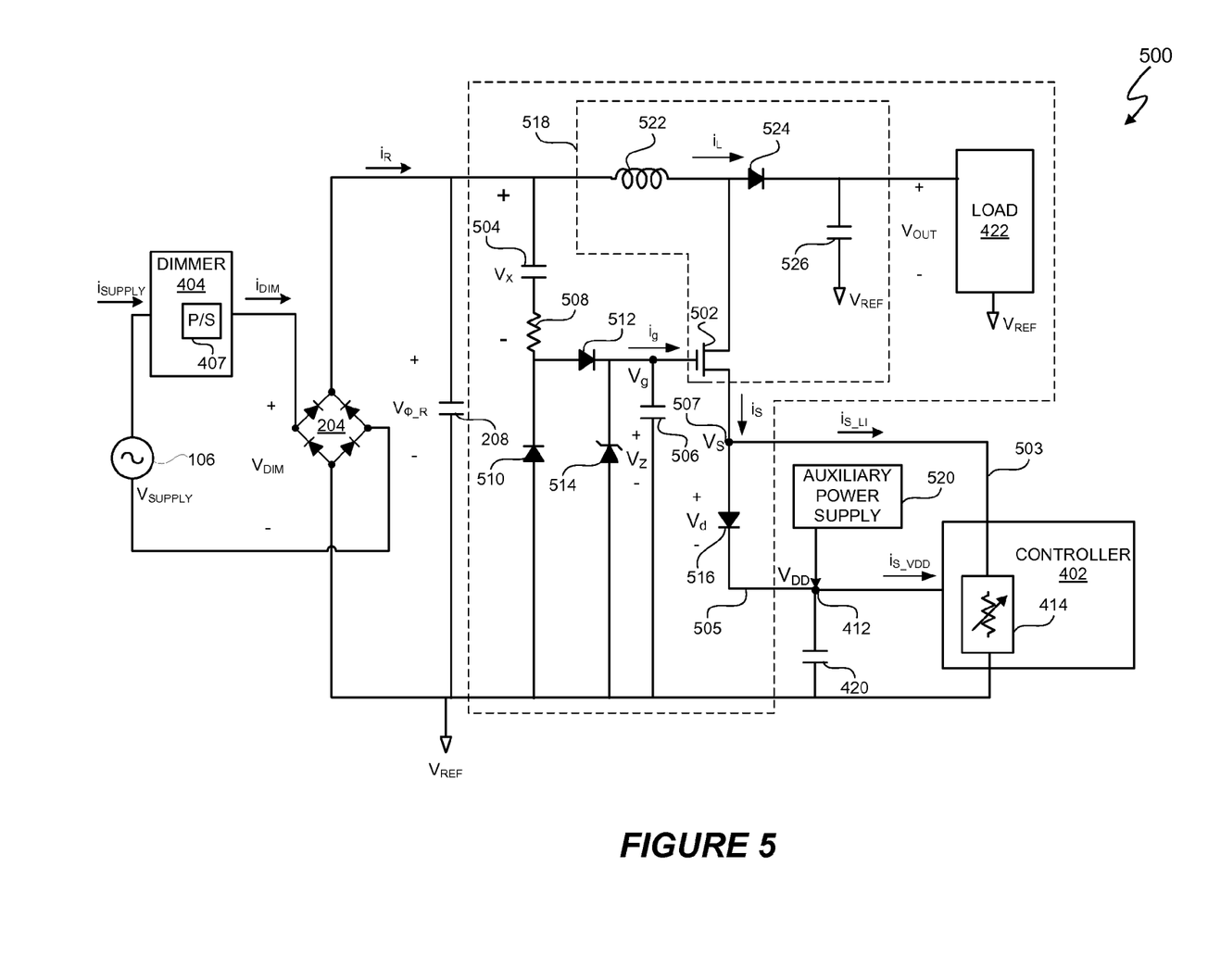
FIG. 5 depicts an electronic system that represents one embodiment of the electronic system of FIG. 4.

FIG. 5 depicts an electronic system 500 that represents one embodiment of the electronic system 400. As subsequently described in more detail, electronic system 500 includes a source follower FET 502, to conduct a source current $i_S$ for controller 402. During an OFF mode of dimmer 404, the controller 402 alternatively enables the current paths 503 and 505 to allow the supply current $i_{SUPPLY}$ to continue flowing. Current paths 503 and 505 respectively represent an embodiment of current paths 406 and 410.

Voltage source 106, rectifier 304, and capacitor 308 function as previously described to generate the rectified voltage $V_{\phi\_R}$. Capacitors 504 and 506 establish a voltage divider to set a gate bias voltage $V_g$ for FET 502. In at least one embodiment, the particular capacitance values of capacitors 504 and 506 are a matter of design choice. In at least one embodiment, the capacitance of capacitor 504 is 22-47 nF, and the capacitance of capacitor 506 is 47 nF. Resistor 508 has a resistance in the range of, for example, 1 kohm to 20 kohm. Resistor 508 shapes the gate current $i_g$ charging capacitor 506 and limits peak current $i_g$. Diode 510 prevents the gate current $i_g$ from being conducted to the voltage reference $V_{REF}$, such as a ground reference. The gate current $i_g$ is conducted through diode 512, which prevents reverse current flow of the gate current $i_g$, to the gate of source follower FET 502. Zener diode 514 clamps the gate of source follower FET 502 to the gate voltage $V_g$. When the gate bias voltage $V_g$ minus the source voltage $V_S$ at source voltage node 507 of FET 502 exceeds a threshold voltage of FET 502, FET 502 conducts the source current $i_S$.

Whether source current $i_S$ flows through the low impedance current path 503 or the voltage node current path 505 depends on the impedance value of variable impedance 414 set by controller 402. When controller 402 sets the impedance value high for variable impedance 414 so that current $i_{S\_LI}$ is, for example, 0 A, the source current $i_S$ flows through FET 502 and raises the source voltage $V_S$. When the source voltage $V_S$ is greater than the forward bias voltage of diode 516, the current path 505 is enabled, and the source current $i_S$ flows through diode 516 to charge capacitor 420 to the operating voltage $V_{DD}$. The capacitance of capacitor 420 is, for example, 10 μF. If the voltage node 412 is allowed to fully charge, the operating voltage $V_{DD}$ across capacitor 420 rises to the Zener voltage $V_Z$ minus the threshold voltage $V_{T502}$ of FET 502 minus the diode voltage $V_d$ across diode 516, i.e. $V_{DD}=V_Z-V_{T502}-V_d$. FET 502 is a high voltage FET that is used to control boost-type switching power converter 518, and the threshold voltage $V_{T502}$ of FET 502 is, for example, approximately 3 V.

When controller 402 sets the impedance value of variable impedance 414 to a low impedance value, low impedance current path 503 is enabled, and current $i_{S\_LI}$ discharges the source of FET 506. When the source of FET 506 drops, the voltage $V_S$ drops. When the voltage $V_S$ drops, diode 516 become reversed biased, thus, disabling the current path 505 for the source current $i_S$ through diode 516. Thus, modulating the impedance of variable impedance 414 alternately enables and disables the current paths 503 and 505 when dimmer 404 is in an OFF mode.

When dimmer 404 functions in a dimming mode, an auxiliary power supply 520 maintains the voltage $V_{DD}$ at voltage node 412 as, for example, described in Melanson II. When dimmer 404 in a dimming mode, controller 402 causes FET 502 to conduct and, thus, energize inductor 522 and then turn FET 502 "off" (i.e. nonconductive) so that the inductor current $i_L$ flows through diode 524 and maintains the voltage $V_{OUT}$ across capacitor 526 as more fully described in Melanson I and Melanson II.

Figure 6:
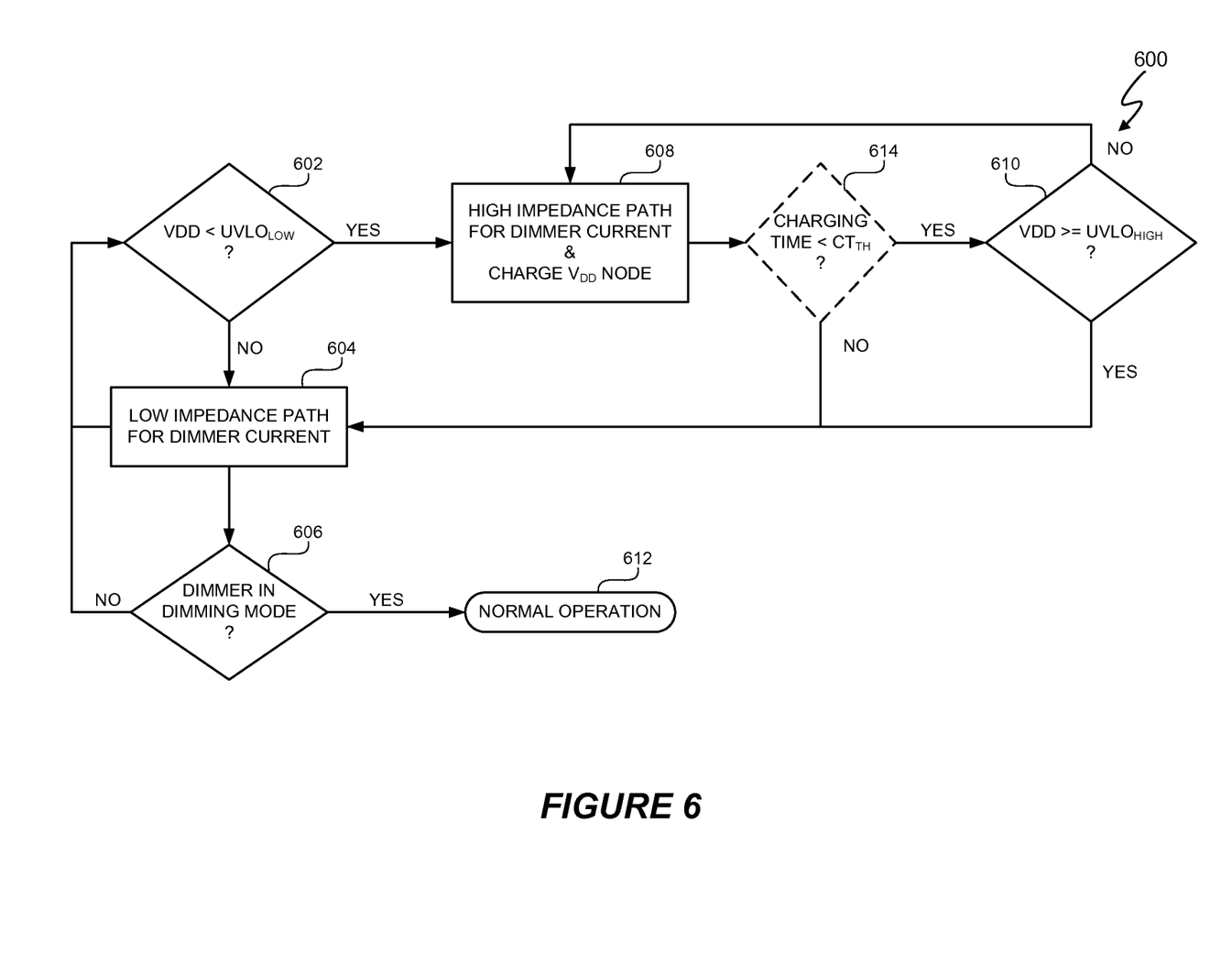
FIG. 6 depicts a dimmer-power supply support process, which represents one embodiment of a process used by a controller of the electronic system of FIG. 5 to alternately enable current paths.
Figure 7:
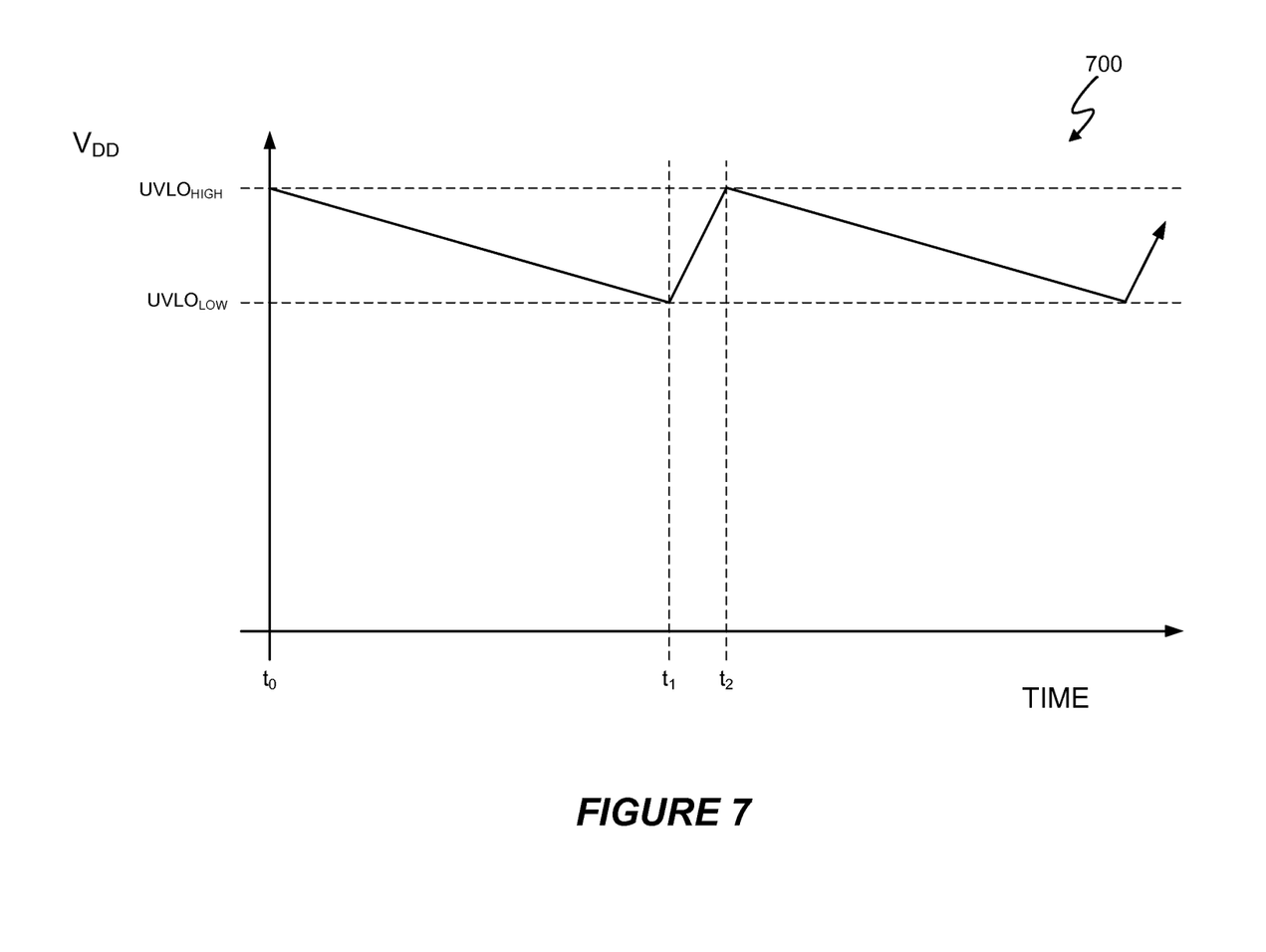
FIG. 7 depicts an exemplary supply voltage waveform with variable impedance decision thresholds.

FIG. 6 depicts a dimmer-power supply support process 600, which represents one embodiment of a process used by controller 402 to alternately enable (and, thus, also alternatively disable) the current paths 503 and 505 (FIG. 5). FIG. 7 depicts an exemplary supply voltage $V_{DD}$ waveform 700 with variable impedance decision thresholds $UVLO_{HIGH}$ and $UVLO_{LOW}$. The voltage $V_{DD}$ referenced in FIGS. 6 and 7 may be the actual voltage $V_{DD}$ at voltage node 412 or may be a scaled version. Referring to FIGS. 5, 6, and 7, the controller 402 performs the dimmer-power supply support process 600 when the dimmer 404 is in a non-dimming mode. The dimmer-power supply support process 600 begins at operation 602 when the controller 402 determines whether the voltage $V_{DD}$ at voltage node 412 is less than or greater than the low decision threshold $UVLO_{LOW}$. If the voltage $V_{DD}$ is greater than the low decision threshold $UVLO_{LOW}$, the voltage $V_{DD}$ is still large enough to allow controller 402 to maintain operations such as performing the dimmer-power supply support process 600. If the voltage $V_{DD}$ is below the low decision threshold $UVLO_{LOW}$, the voltage $V_{DD}$ is trending too low to allow the controller 402 to maintain operations. The particular value of low decision threshold $UVLO_{LOW}$ is a function of the voltage parameters of controller 402. In at least one embodiment, the low decision threshold $UVLO_{LOW}$ is 7V.

Referring to operation 602, if the voltage $V_{DD}$ is greater than the low decision threshold $UVLO_{LOW}$, such as between times $t_0$ and $t_1$ in FIG. 7, then in operation 604, controller 402 sets the variable impedance 414 to a low impedance value, thus, enabling the low impedance current path 503. Thus, a non-zero supply current $i_{SUPPLY}$ continues to flow into dimmer 404 and allows power supply 407 to continue to operate. In operation 606, the controller 402 continues to monitor the rectified input voltage $V_{\phi\_R}$ to determine whether dimmer 404 is in the OFF mode or has entered the dimming mode where the dimmer 404 phase cuts the rectified input voltage $V_{\phi\_R}$ at an angle greater than 0 degrees or provides full dimming. If the dimmer 404 is still in the OFF mode, dimmer-power supply support process 600 returns to operation 602.

As the source current $i_S$ flows into variable impedance 414 through low impedance current path 503, the voltage $V_{DD}$ decreases between times $t_0$ and $t_1$ as the controller 402 draws charge from capacitor 420. Thus, if dimmer 404 remains in the OFF mode, the voltage $V_{DD}$ will decrease below the low decision threshold $UVLO_{LOW}$. Operations 602, 604, and 606 continue until the voltage $V_{DD}$ is less than the low decision threshold $UVLO_{LOW}$. When operation 602 determines that the voltage $V_{DD}$ is less than the low decision threshold $UVLO_{LOW}$ at time $t_1$, controller 402 performs operation 608.

In operation 608, the controller 404 enables the voltage node current path 505 by setting the variable impedance 414 to a high impedance value. As previously described, when the variable impedance 414 is set to a high impedance value, the source voltage $V_S$ of FET 502 rises to forward bias diode 516 and increase the voltage $V_{DD}$ by charging capacitor 420. In at least one embodiment, the voltage $V_{DD}$ begins to increase when the dimmer sources the current during period 155 (FIG. 1A) of the supply voltage $V_{SUPPLY}$. Thus, the voltage $V_{DD}$ may not rise immediately. Operation 610 continues to monitor the voltage $V_{DD}$ to determine when the voltage $V_{DD}$ reaches the high decision threshold $UVLO_{HIGH}$. In FIG. 7, the voltage $V_{DD}$ rises from the low decision threshold $UVLO_{LOW}$ to the high decision threshold $UVLO_{HIGH}$ between times $t_1$ and $t_2$. In at least one embodiment, the time period from $t_1$ to $t_2$ is small enough so that there is no discontinuity in the supply current $i_{SUPPLY}$. In at least one embodiment, the time period from $t_1$ to $t_2$ is approximately 100 μsec. (Note, the time periods between $t_0$, $t_1$, and $t_2$, are not necessarily drawn to scale but are depicted to illustrate the increases and decreases of voltage $V_{DD}$.) The particular value of high decision threshold $UVLO_{HIGH}$ is a matter of design choice and depends, for example, on the operational voltage parameters of controller 402. The value of high decision threshold $UVLO_{HIGH}$ is, for example, 9V.

When the voltage $V_{DD}$ reaches the high decision threshold $UVLO_{HIGH}$, dimmer-power supply support process 600 proceeds to operation 604, and controller 402 enables the low impedance current path 503. When operation 606 detects that the dimmer 404 is in the dimming mode, in normal operation 612, controller 402 begins normal operation that includes controlling power conversion by the power converter 418 as, for example, described in Melanson I and Melanson II. In at least one embodiment, during normal operation, current paths 410 and 406 are disabled.

In at least one embodiment, the charging time of the voltage supply node 412 is also taken into account by the dimmer-power supply support process 600. In at least one embodiment, the dimmer-power supply support process 600 allows the voltage supply node 412 to charge for a maximum of time equal to a charging time threshold value $CT_{TH}$. The time limitation for charging the voltage supply node 412 is implemented to prevent using too much of the current $i_{DIM}$ from the dimmer 404 to charge the voltage supply node 412 and, thus, preventing the power supply 407 from having enough current to maintain operation of the dimmer 404. Thus, in at least one embodiment the dimmer-power supply support process 600 includes operation 614. Operation 614 determines if the charging time for the supply voltage node $V_{DD}$ is less than the charging time threshold value $CT_{TH}$. If so, the dimmer-power supply support process 600 proceeds to operation 610. If the charging time for the supply voltage node $V_{DD}$ is greater than the charging time threshold value $CT_{TH}$, the dimmer-power supply support process 600 proceeds to operation 604 to enable the low impedance path 503 to allow the power supply 407 to generate a supply voltage for the dimmer 404. The value of the charging time threshold value $CT_{TH}$ is a matter of design choice and depends upon how much charge is utilized to raise the voltage $V_{DD}$ to the high decision threshold $UVLO_{HIGH}$ and how much current is needed by the power supply 407 to maintain operation of the dimmer 404. In at least one embodiment, the charging time threshold value $CT_{TH}$ is a programmable parameter of controller 402. In at least one embodiment, the charging time threshold value $CT_{TH}$ is a fixed parameter of controller 402.

In at least one embodiment, the controller 402 includes a microprocessor (not shown) and a memory (not shown)

coupled to the processor. The memory stores code that is executable by the processor to implement dimmer-power supply support process 600. In at least one embodiment, the dimmer-power supply support process 600 is implemented using hardware as, for example, described in conjunction with FIG. 7.

Figure 8:
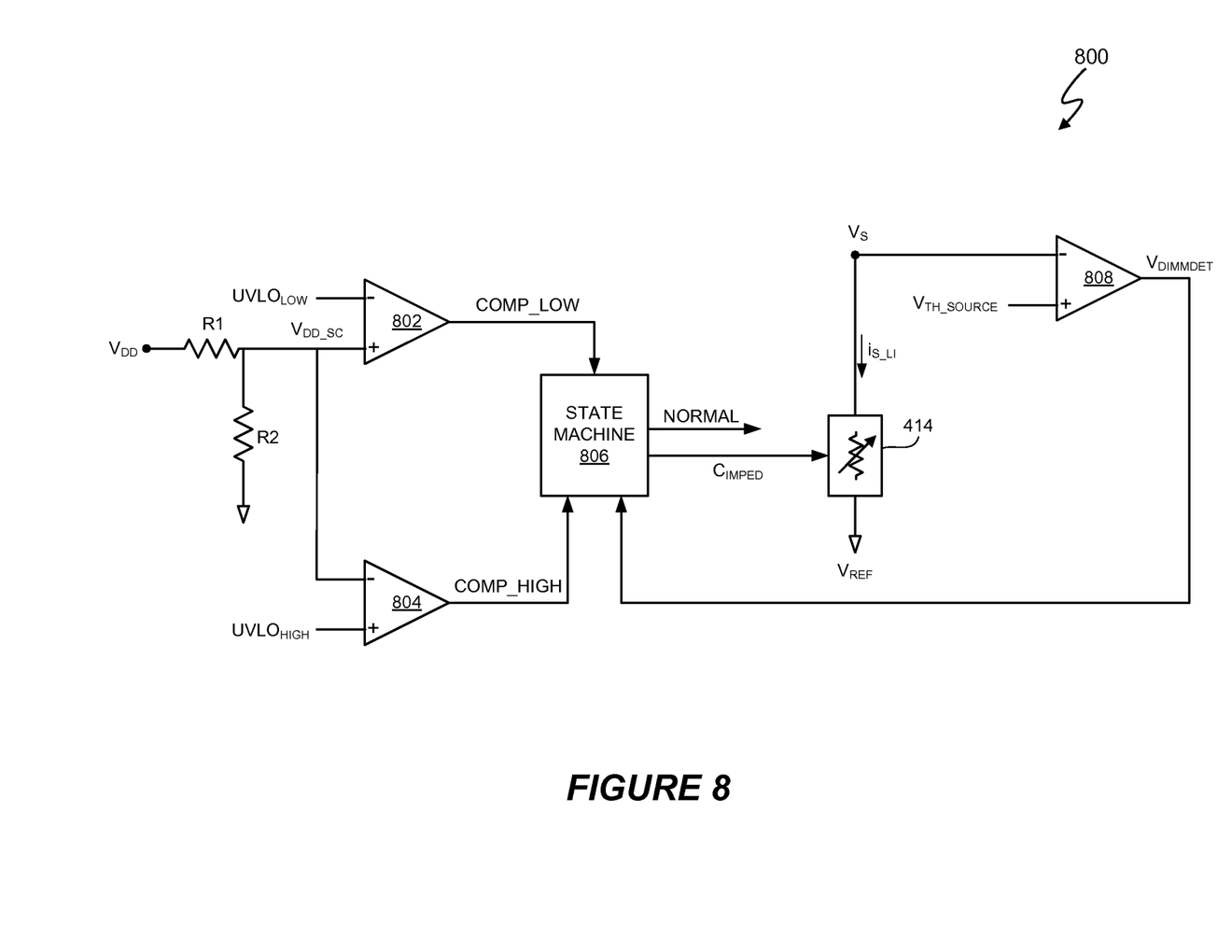
FIG. 8 depicts a dimmer power supply support circuit that implements an embodiment of the dimmer-power supply support process of FIG. 6.

FIG. 8 depicts a dimmer power supply support circuit 800 that implements an embodiment of the dimmer-power supply support process 600. The voltage divider R1 and R2 generates a scaled version $V_{DD\_SC}$ of voltage $V_{DD}$ for comparison with the respective low and high voltage thresholds $UVLO_{LOW}$ and $UVLO_{HIGH}$. For purposes of this application, references to the scaled version $V_{DD\_SC}$ of voltage $V_{DD}$ are functionally equivalent and used interchangeably. Comparator 802 compares the voltage $V_{DD\_SC}$ with the low threshold $UVLO_{LOW}$. If the voltage $V_{DD\_SC}$ is less than low threshold voltage $UVLO_{LOW}$, comparator 802 generates an output signal COMP_LOW having a logical 0 value, and otherwise generates a logical 1 value for output signal COMP_LOW. Comparator 804 compares the voltage $V_{DD\_SC}$ with the high threshold $UVLO_{HIGH}$. If the voltage $V_{DD\_SC}$ is greater than high threshold voltage $UVLO_{LOW}$, comparator 804 generates an output signal COMP_HIGH having a logical 0 value, and otherwise generates a logical 1 value for output signal COMP_HIGH. The state machine 806 receives the output signals COMP_LOW and COMP_HIGH and alternately enables current paths 503 and 505 using the same process flow as described in conjunction with dimmer-power supply support process 600 (FIG. 6). The state machine 806 generates the variable impedance control signal $C_{IMPED}$ to modulate the impedance value of variable impedance 414 and, thus, alternately enable current paths 503 and 505.

Referring to FIGS. 5 and 8, in at least one embodiment, the controller 402 determines when the dimmer 404 operates in the OFF mode or the dimming mode by monitoring the source voltage $V_S$ of FET 502. If the dimmer 404 is in the dimming mode, the source voltage $V_S$ will be higher than when the dimmer 404 is in the OFF mode because during the dimming mode, more current is available to charge the source voltage node 507. Dimmer power supply support circuit 800 includes comparator 808 to compare the source voltage $V_S$ (i.e. the source voltage of FET 502 of FIG. 5) with a source threshold value $V_{TH\_SOURCE}$ to determine whether the dimmer 404 is in the OFF mode or the dimming mode. The source threshold value $V_{TH\_SOURCE}$ is set so that if the source voltage $V_S$ is less than $V_{TH\_SOURCE}$, comparator 808 generates a dimmer mode detection output signal $V_{DIMMDET}$ having a logical 1 value indicating that the dimmer 404 is operating in the OFF mode. Conversely, if the source voltage $V_S$ is greater than $V_{TH\_SOURCE}$, comparator 808 generates a dimmer mode detection output signal $V_{DIMMDET}$ having a logical 0 value indicating that the dimmer 404 is operating in the dimming mode. An exemplary value of $V_{TH\_SOURCE}$ is 4V.

Figure 9:
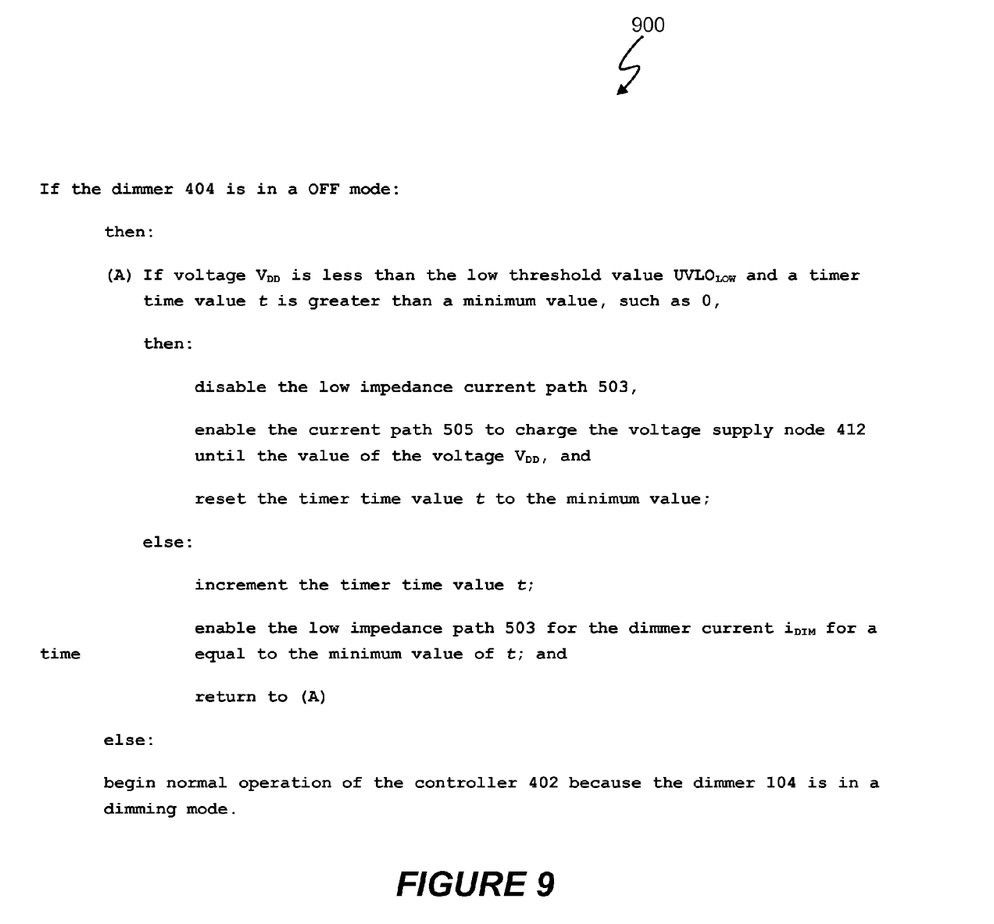
FIG. 9 depicts another dimmer-power supply support process, which represents one embodiment of a process used by a controller of the electronic system of FIG. 5 to alternately enable current paths.

FIG. 9 depicts a dimmer-power supply support process 900 represented by pseudo code, which represents one embodiment of a process used by controller 402 to alternately enable and disable the current paths 503 and 505 (FIG. 5). The particular implementation of the dimmer-power supply support process 900 is a matter of design choice. In at least one embodiment, the dimmer-power supply support process 900 is implemented as actual code that is stored in a memory (not shown) and executable by a microprocessor (not shown) of the controller 402. In at least one embodiment, the dimmer-power supply support process 900 is implemented using any combination of analog components, digital components, and microprocessor executable code. Referring to FIGS. 5, 7, and 9, when the dimmer 404 is in an OFF mode, the dimmer-power supply support process 900 determines if the voltage $V_{DD}$ is less than the low threshold value $UVLO_{LOW}$ and a timer time value t is greater than a minimum value. The minimum value of the timer time value t is, for example, set to provide an initial time for enablement of the low impedance current path 403. Exemplary values for the time index t are from 5 ms to 6 ms. If the voltage $V_{DD}$ is less than the low threshold value $UVLO_{LOW}$ and a timer time value t is greater than a minimum value, then process 900 disables the low impedance current path 503 and enables the current path 505 to charge the voltage supply node 412 until the voltage $V_{DD}$ reaches the low threshold value $UVLO_{LOW}$. The process 900 then resets the timer time value t to the minimum value.

If the voltage $V_{DD}$ is greater than the low threshold value $UVLO_{LOW}$ and a timer time value t is less than the minimum value, process 900 increments the timer time value t and enables the low impedance path 503 for the dimmer current $i_{DIM}$ for a time equal to the minimum value of t. Process 900 then again determines if the voltage $V_{DD}$ is less than the low threshold value $UVLO_{LOW}$ and a timer time value t is greater than a minimum value and repeats as previously described. In at least one embodiment, the process 900 also includes a voltage supply node 412 charging time threshold value $CT_{TH}$ inquiry after the current path 505 is enabled as discussed in conjunction with operation 614 of FIG. 6 to help ensure that the power supply 407 has sufficient current available to maintain operation of the dimmer 404.

If the dimmer 404 is in the dimming mode and the current path 505 is not enabled, controller 402 begins normal operation as described in conjunction with the normal operation 612 of FIG. 6.

Figure 10:
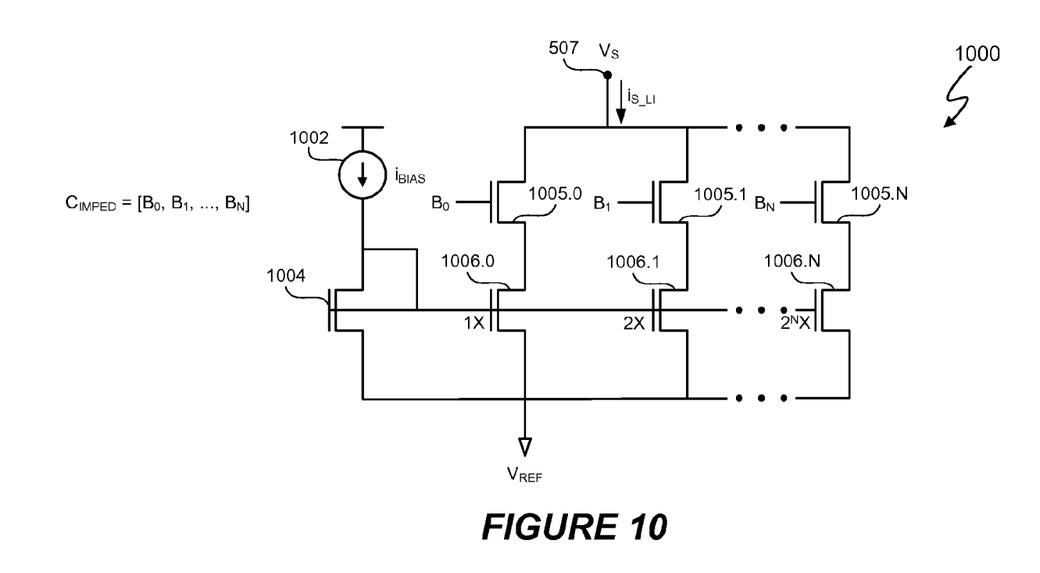
FIGS. 10 and 11 depict exemplary variable impedances.

FIG. 10 depicts current source 1000, which represents one embodiment of variable impedance 414. During operation, current source 1000 sources current from source voltage node 507. Sourcing current from source voltage node 507 discharges source voltage node 507 to a voltage approximately equal to the reference voltage $V_{REF}$. Thus, during operation current source 1000 provides a low impedance path for current $i_{S\_LI}$.

Current source 1000 includes a bias current source 1002 that generates a bias current $i_{BIAS}$. A drain and gate of FET 1004 are connected together to form a "diode connected" configuration. The N+1 series connected FET pairs 1005.0/1006.0 through 1005.N/1006.N are respectively configured in a current mirror arrangement with FET 1004 to mirror the bias current $i_{BIAS}$. "N" is an integer, and the value of N is a matter of design choice. Each pair of FETs 1005.X/1006.X is sized so that each subsequent pair sources twice as much current as the previous pair, e.g. FET pair 1005.1/1006.1 sources twice as much current as FET pair 1005.0/1006.0, and so on. "X" is an integer index ranging from 0 to N. In at least one embodiment, the value of N determines a maximum level of current capable of being sourced through current source 1000.

In at least one embodiment, the variable impedance control signal $C_{IMPED}$ is a digital value having N+1 bits, i.e. $C_{IMPED}$= [$B_0, B_1, \ldots, B_N$]. Each bit $B_0, B_1, \ldots, B_N$ is applied to the gate of a respective FET pair 1005.0/1006.0, 1005.1/1006.1, ..., 1005.N/1006.N to control conductivity of the FET pairs. Thus, in at least one embodiment, to enable current path 503 and disable current path 505 (FIG. 5), controller 402 sets a logical value of $C_{IMPED}$ to [$B_0, B_1, \ldots, B_N$]=[1, 1, ..., 1] to cause each FET pair 1005.0/1006.0, 1005.1/1006.1, ..., 1005.N/1006.N to conduct. In at least one embodiment, to enable current path 505 and disable current path 503, controller 402 sets a logical value of $C_{IMPED}$ to $B_0, B_1, \ldots, B_N$=[0, 0, ..., 0] to cause each FET pair 1005.0/1006.0, 1005.1/1006.1, ..., 1005.N/1006.N to turn "off", i.e. nonconductive.

Figure 11:
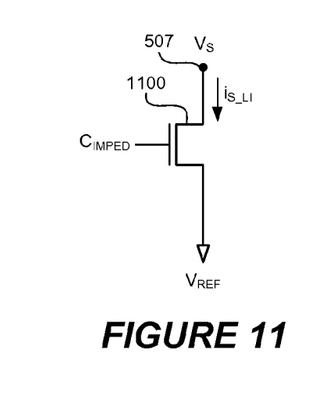

FIG. 11 depicts FET 1100, which represents another embodiment of variable impedance 414. FET 1100 operates as a switch. In at least one embodiment, to enable current path 503 (FIG. 5) and disable current path 505, controller 402 sets a logical value of $C_{IMPED}$ to 1 to cause FET 1100 to turn "on" in saturation mode. In at least one embodiment, to enable current path 505 and disable current path 503, controller 402 sets a logical value of $C_{IMPED}=0$ to cause FET 1100 to turn "off".

Thus, in at least one embodiment, a system and method includes a controller that alternately enables at least at least two different current paths for a current flowing through a dimmer when the dimmer is in an OFF mode to, for example, allow a power supply of the dimmer and the controller to continue functioning.

Although embodiments have been described in detail, it should be understood that various changes, substitutions, and alterations can be made hereto without departing from the spirit and scope of the invention as defined by the appended claims.

What is claimed is:

1. A method comprising:
   during an OFF mode of a dimmer, alternately enabling at least two different current paths for a current flowing through the dimmer, wherein two of the current paths comprise a low impedance path to a reference node and a path to a voltage supply node of a switching power converter controller; and
   during a dimming mode of the dimmer, controlling power conversion by a power converter.

2. The method of claim 1 further comprising:
   determining when to enable the at least two different current paths, wherein determining when to enable the at least two different current paths comprises:
   sensing a voltage at the voltage supply node;
   if the voltage is below a first voltage level, enabling the path to the voltage supply node; and
   after enabling the path to the voltage supply node, if the voltage is above a second voltage level, enabling the low impedance path for at least a predetermined period of time.

3. The method of claim 1 further comprising:
   determining when to enable the at least two different current paths, wherein determining when to enable the at least two different current paths comprises:
   sensing a voltage at the voltage supply node;
   if the voltage is below a first voltage level, enabling the path to the voltage supply node; and
   after enabling the path to the voltage supply node, if either (i) the voltage is above a second voltage level or (ii) the path to the voltage supply node has been enabled for a predetermined period of time, enabling the low impedance path for at least a predetermined period of time.

4. The method of claim 1 further comprising:
   determining when to enable the at least two different current paths, wherein determining when to enable the at least two different current paths comprises:
   sensing a voltage at the voltage supply node; and
   if the voltage is below a first voltage level, enabling the path to the voltage supply node.

5. The method of claim 1 further comprising:
   determining when to enable the at least two different current paths, wherein determining when to enable the at least two different current paths comprises:
   sensing a voltage at the voltage supply node; and
   if the voltage is below a first voltage level, enabling the path to the voltage supply node until either (i) the voltage is above the first voltage level or (ii) the path to the voltage supply node has been enabled for a predetermined period of time.

6. The method of claim 1 wherein alternately enabling at least two different current paths for a current flowing through the dimmer comprises:
   modulating an impedance in the low impedance path such that when the impedance is modulated to a first impedance value the current path through the low impedance path is enabled and when the impedance is modulated to a second value the path to the voltage supply node is enabled.

7. The method of claim 6 wherein modulating the impedance comprises:
   modulating a current source coupled to the low impedance path to control current through the low impedance path.

8. The method of claim 6 wherein modulating the impedance comprises:
   modulating a resistance of a current path through a field effect transistor.

9. The method of claim 1 further comprising:
   during the OFF mode, monitoring a supply voltage for a load coupled to the switching power converter to determine when the dimmer is in the OFF mode; and
   when the dimmer is in a dimming mode, disabling at least the low impedance path.

10. The method of claim 1 wherein enabling the low impedance path comprises reducing a voltage at a source of a source-follower configured transistor so that the current flowing through the dimmer flows through the low impedance path and does not charge the voltage supply node, the method further comprising:
    sensing a voltage level at the voltage supply node;
    if the voltage level at the voltage supply node is below a predetermined threshold value:
    increasing the impedance of the low impedance path to increase the voltage at the source-follower so that the current flowing through the source-follower configured transistor charges a capacitor and thereby increases the voltage at the voltage supply node.

11. The method of claim 1 wherein current flow through the at least two current paths is mutually exclusive.

12. The method of claim 1 further comprising:
    dimming a supply voltage to generate a dimming voltage;
    providing the dimming voltage to a switching power converter;
    converting the dimming voltage into an output voltage for at least one light emitting diode.

13. An apparatus comprising:
    a controller, wherein:
    during an OFF mode of a dimmer, the controller is configured to alternately enable at least two different current paths for a current flowing through the dimmer, wherein two of the current paths comprise a low impedance path to a reference node and a path to a voltage supply node of a switching power converter controller; and
    during a dimming mode of the dimmer, the controller is configured to control power conversion by a power converter.

14. The apparatus of claim 13 wherein the controller is further configured to:

determine when to enable the at least two different current paths, to determine when to enable the at least two different current paths the controller is further configured to at least:
sense a voltage at the voltage supply node;
if the voltage is below a first voltage level, enable the path to the voltage supply node; and
after the path to the voltage supply node is enabled, if the voltage is above a second voltage level, enable the low impedance path for at least a predetermined period of time.

15. The apparatus of claim 13 wherein the controller is further configured to:
determine when to enable the at least two different current paths, to determine when to enable the at least two different current paths the controller is further configured to at least:
sense a voltage at the voltage supply node;
if the voltage is below a first voltage level, enable the path to the voltage supply node; and
after the path to the voltage supply node is enabled, if either (i) the voltage is above a second voltage level or (ii) the path to the voltage supply node has been enabled for a predetermined period of time, enabling the low impedance path for at least a predetermined period of time.

16. The apparatus of claim 13 wherein the controller is further configured to:
determine when to enable the at least two different current paths, wherein to determine when to enable the at least two different current paths the controller is further configured to at least:
sense a voltage at the voltage supply node; and
if the voltage is below a first voltage level, enable the path to the voltage supply node.

17. The apparatus of claim 13 wherein the controller is further configured to:
determine when to enable the at least two different current paths, wherein to determine when to enable the at least two different current paths the controller is further configured to at least:
sense a voltage at the voltage supply node; and
if the voltage is below a first voltage level, enable the path to the voltage supply node until either (i) the voltage is above the first voltage level or (ii) the path to the voltage supply node has been enabled for a predetermined period of time.

18. The apparatus of claim 13 wherein to alternately enable at least two different current paths for a current flowing through the dimmer the controller is further configured to at least:
modulate an impedance in the low impedance path such that when the impedance is modulated to a first impedance value the current path through the low impedance path is enabled and when the impedance is modulated to a second value the path to the voltage supply node is enabled.

19. The apparatus of claim 18 wherein to modulate the impedance the controller is further configured to at least:
modulate a current source coupled to the low impedance path to control current through the low impedance path.

20. The apparatus of claim 18 wherein to modulate the impedance the controller is further configured to at least:
modulate a resistance of a current path through a field effect transistor.

21. The apparatus of claim 13 wherein the controller is further configured to:
during the OFF mode, monitor a supply voltage for a load coupled to the switching power converter to determine when the dimmer is in the OFF mode; and
when the dimmer is in a dimming mode, disabling at least the low impedance path.

22. The apparatus of claim 13 wherein to enable the low impedance path the controller is further configured to reduce a voltage at a source of a source-follower configured transistor so that the current flowing through the dimmer flows through the low impedance path and does not charge the voltage supply node, and the controller is further configured to:
sense a voltage level at the voltage supply node;
if the voltage level at the voltage supply node is below a predetermined threshold value:
increase the impedance of the low impedance path to increase the voltage at the source-follower so that the current flowing through the source-follower configured transistor charges a capacitor and thereby increases the voltage at the voltage supply node.

23. The apparatus of claim 13 wherein current flow through the at least two current paths is mutually exclusive.

24. The apparatus of claim 13 further comprising:
the dimmer,
a switching power converter coupled to the dimmer and the controller; and
at least one light emitting diode coupled to the switching power converter.

25. The apparatus of claim 13 wherein the dimmer comprises a controller and a power supply.

26. An apparatus comprising:
means for alternately enabling at least two different current paths for a current flowing through the dimmer, wherein two of the current paths comprise a low impedance path to a reference node and a path to a voltage supply node of a switching power converter controller during an OFF mode of a dimmer; and
means for controlling power conversion by a power converter during a dimming mode of the dimmer.

27. The apparatus of claim 26 further comprising:
means for generating a dimmer voltage;
means for converting the dimmer voltage into an output voltage; and
a lamp that includes one or more light emitting diodes to receive the output voltage.

* * * * *